`US006073110A`

United States Patent [19]
Rhodes et al.

[11] Patent Number: 6,073,110
[45] Date of Patent: Jun. 6, 2000

[54] ACTIVITY BASED EQUIPMENT SCHEDULING METHOD AND SYSTEM

[75] Inventors: Neil Rhodes, Evanston; Theo Frutiger, Buffalo Grove; Maria A. Power, Palos Heights; Michael H. Soemo, Lombard, all of Ill.

[73] Assignee: Siemens Building Technologies, Inc., Buffalo Grove, Ill.

[21] Appl. No.: 08/898,657

[22] Filed: Jul. 22, 1997

[51] Int. Cl.[7] .................................................. G06F 17/60
[52] U.S. Cl. ..................... 705/8; 705/7; 705/9; 345/348; 345/963
[58] Field of Search ....................... 705/8, 9, 7; 395/500; 345/348, 963; 236/51

[56] References Cited

U.S. PATENT DOCUMENTS

| | | | |
|---|---|---|---|
| 4,187,543 | 2/1980 | Healey et al. | 364/528.12 |
| 4,335,847 | 6/1982 | Levine . | |
| 4,386,649 | 6/1983 | Hines et al. | 364/145 |
| 4,937,743 | 6/1990 | Rassman et al. | 364/401 |
| 5,203,497 | 4/1993 | Ratz | 236/46 R |
| 5,270,920 | 12/1993 | Pearse et al. | 364/401 |
| 5,289,362 | 2/1994 | Liebl et al. | 705/412 |
| 5,295,065 | 3/1994 | Chapman et al. | 364/401 |
| 5,344,068 | 9/1994 | Haessig | 236/47 |
| 5,369,570 | 11/1994 | Parad | 364/401 |
| 5,487,144 | 1/1996 | Takahashi et al. | 395/161 |
| 5,504,921 | 4/1996 | Dev et al. . | |
| 5,511,188 | 4/1996 | Pascucci et al. . | |
| 5,539,633 | 7/1996 | Hildebrand et al. | 364/152 |
| 5,544,036 | 8/1996 | Brown, Jr. et al. | 364/528.12 |
| 5,640,153 | 6/1997 | Hildebrand et al. | 340/825.06 |
| 5,706,191 | 1/1998 | Bassette et al. | 364/528.09 |
| 5,748,907 | 5/1998 | Crane | 395/202 |
| 5,761,083 | 6/1998 | Brown, Jr. et al. | 364/528.31 |
| 5,801,940 | 9/1998 | Russ et al. | 364/528.11 |

*Primary Examiner*—James P. Trammell
*Assistant Examiner*—Cuong H. Nguyen
*Attorney, Agent, or Firm*—Greer, Burns & Crain, Ltd.

[57] ABSTRACT

A computer based equipment scheduling system uses activity definition data to schedule equipment. The method may be carried out by a networked computer system that receives activity definition data representing an activity, such as a volleyball game or board meeting, that occurs in a building. This data is stored in a database for use by multiple nodes. The activity definition data may include text or graphical data indicating an activity name, data representing a list of zones that the activity will affect and data representing the mode of possible operation of each building zone affected by the activity. The method also includes assigning zone mode data to the activity data for use in controlling building resources and then automatically controlling the building resources to attain a zone mode of operation assigned to the activity definition data.

12 Claims, 11 Drawing Sheets

September 1998

| Monday | Tuesday | Wenesday | Thursday | Friday | Saturday | Sunday |
|--------|---------|----------|----------|--------|----------|--------|
|        |         |          |          | 1      | 2        | 3      |
| 4      | 5       | 5        | 7        | 8      | 9        | 10     |
| 11     | 12      | 13       | 14       | 15     | 16       | 17     |
| 18     | 19      | 20       | 21       | 22     | 23       | 24     |
| 25     | 26      | 27       | 28       | 29     | 30       | 31     |

CALENDAR GRAPHIC — 113

Activities — 32
- School Operation
- Office Operation
- Library Operation
- Chess Club
- Concert Class
- Church
- Community Education
- Cleaning

Fig. 5B

ACTIVITY BASED EQUIPMENT SCHEDULING METHOD AND SYSTEM

BACKGROUND OF THE INVENTION

The invention relates generally to systems for controlling equipment and more particularly to computerized systems for scheduling equipment in buildings.

In conventional building HVAC equipment scheduling systems, a weekly schedule is typically the sole means stored in a database for equipment control and is used to ultimately control building resources such as fans, blowers, coolers and dampers in a defined zone to effect a desired environmental condition. Each weekly schedule is automatically repeated so that the building resource schedules for each day are the same for each week. Such systems are sometimes referred to as time of day based systems.

If a different schedule is necessary, an override command must typically be issued for each of those building resources that are to be operated differently. This override usually requires the intervention of an experienced building engineer with knowledge of the building and the name, location and types of various building resources, and the mode of operation necessary for each zone. It would be advantageous if the scheduling system allowed for flexible scheduling and scheduling modifications by persons not having technical knowledge concerning building resources or zone operating modes.

The initial scheduling and occupancy period data inputting in typical systems also requires technical knowledge since it is generally accomplished by naming a zone and inputting data representing the occupancy periods for a single week for that zone. Such zone selection and occupancy period data inputting requires knowledge of building resource allocations and set points, among other technical information. Therefore, it would be advantageous to have a more straightforward scheduling system that could be easily operated by persons not having technical knowledge concerning building systems, such as administrative personnel.

SUMMARY OF THE INVENTION

Accordingly, it is a general object of the present invention to provide a straightforward nontechnical improved automated equipment scheduling method and system that is based on the matching of defined activity data to a graphical calendar, thereby offering improved user flexibility and system control.

Another object of the present invention is to provide an improvement and zone definition building control systems, by providing an improved activity definition scheduling system that allows building resources to be scheduled in flexible time increments and repetitively for any selected day or days of the year or years.

To meet these objects, an activity based equipment scheduling method is disclosed herein that receives activity definition data representing an activity, such as a volleyball game or a board meeting, that occurs in the building. This data is stored in a database for use by multiple nodes of a building control system network. The activity definition data is preferably created using a text and graphical interface by a technical operator during system setup or reconfiguration. Preferably, the activity definition data includes activity name data, data representing a list of zones that the activity will affect and data representing the required operational mode of each building zone affected by the particular activity. Thus, zone operational mode data is associated with the activity data for use in automatically controlling the building resources to attain a corresponding zone mode of operation assigned to selected activity definition data. Importantly, a nontechnical operator may easily schedule activities by selecting activities and times.

The scheduling is preferably accomplished by matching the activity name data to a graphical calendar schedule that references the activity data, and assigning attributes to the calendar schedule including time interval data, start time data, stop time data, number of days spanned data, frequency of occurrence data and duration range data. A nontechnical user drags and drops the activity name data to a desired date or dates in the displayed calendar and the computer links the activity identifier to the calendar schedule to effect the scheduling of the activity to a selected calendar date. Resources are then controlled according to the selected activity name for the zones indicated by the activity definition data.

Preferably, the method of activity based equipment scheduling is carried out by a computer system that stores a global state text table for a plurality of zones. The global state text table contains data representing possible modes of operation, organized to resolve conflicts if scheduling of separate activities results in conflicting operational modes. Zones are separately associated with one or more elements of the state text table. The computer system stores activity definition data representing how a particular activity will affect one or more of the zones, and sends the control data to another computer for automatically controlling the building resources using an activity selected by a user from the activity schedule to attain the mode of operation corresponding to the activity definition data.

BRIEF DESCRIPTION OF THE DRAWINGS

The features of the present invention together with the further objects and advantages thereof, may be understood by reference to the following description taken in conjunction with the accompanying drawings wherein:

FIG. 5B is an example of a screen display for scheduling activities in accordance with one embodiment of the invention;

DETAILED DESCRIPTION OF THE INVENTION

Broadly stated, the disclosed activity based equipment scheduling system uses activity definition data that represents an activity that places demands on equipment in a zone or group of zones. This activity definition data includes activity name data which serves as user input data permitting easy scheduling of building systems for an activity by a nontechnical operator. An example of an activity may be a volleyball game, chess club meeting or other activity that occurs in a building. Some important benefits of the activity based equipment scheduling system are the ease of use, its flexibility, and its ability to globally control the building resources.

Activity definition data is stored in a computer to link specified building zones and building resources. A set of activity definitions describe how zones are affected by various building activities. Once created, these activity definitions are used to schedule activities by matching activity name data to a system calendar. Upon matching of activity name data to the system calendar, the activity definitions are used by a computer system and automatically derive operational modes for each building zone affected by the selected activity.

Figure 1:
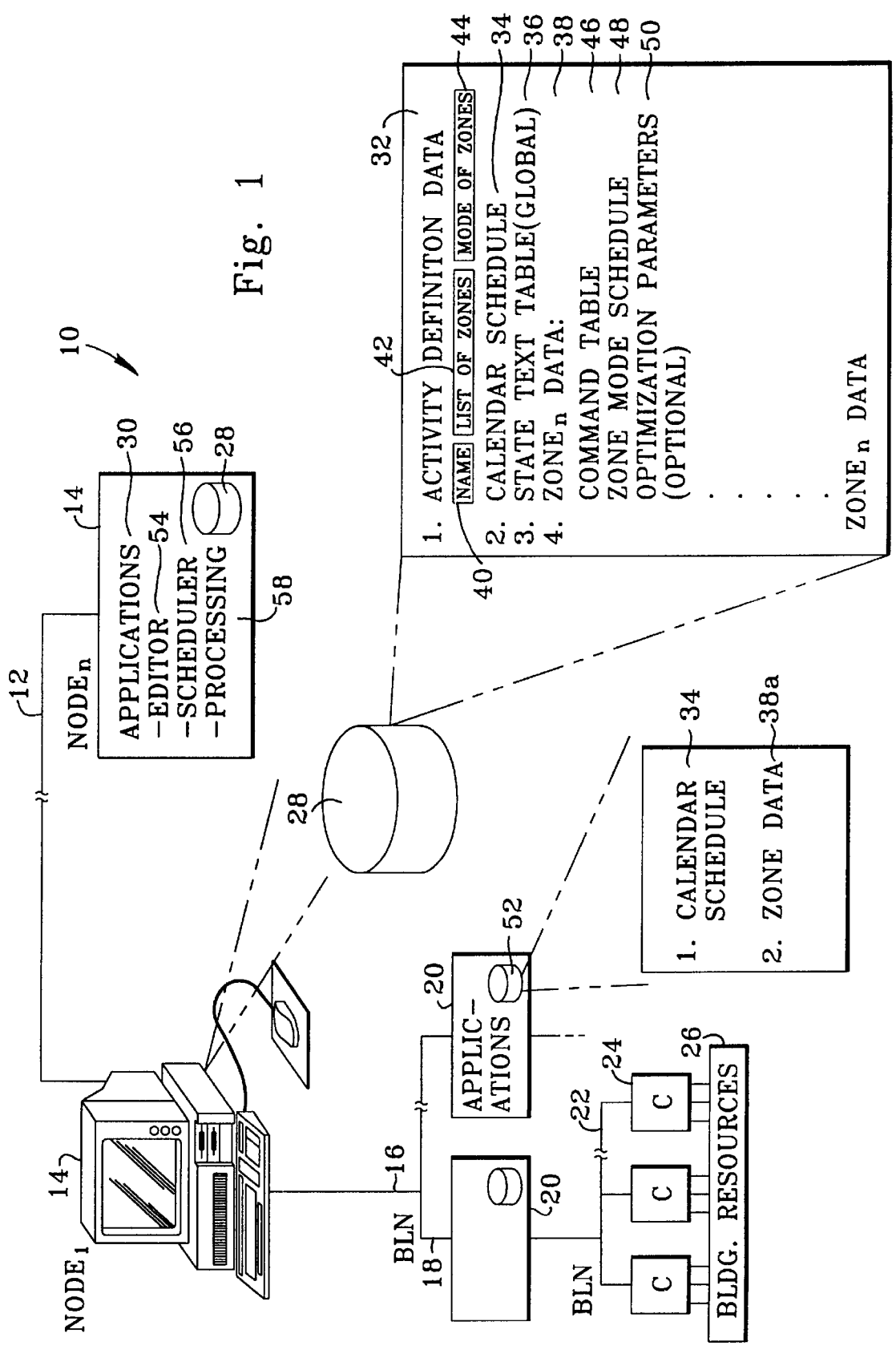
FIG. 1 is a block diagram generally depicting one embodiment of a building automation and control system employing an activity based equipment scheduling system in accordance with the invention.

One embodiment of a networked computer system 10 having an activity based equipment scheduling system according to the present invention is shown in FIG. 1. The network computer system 10 is a multi-node, multi-layer system wherein a first network layer 12 includes a number of high level nodes 14, such as personal computers connected via an Ethernet type link. The highest level layer 12 will be referred to as the management level network (MLN). Each of the nodes 14 may be connected by another lower level network link 16 to a lower level network 18, referred to herein as a building level network (BLN). The building level network 18 includes a number of computer control nodes 20 for communicating with lower level control devices through another network 22, referred to herein as a field level network (FLN). Like the node 14, the computer control nodes 20 have man-machine interfaces (not shown) to allow a technical operator to enter set up information for the activity based scheduling system. The FLN 22 contains a number of controllers 24 for controlling building resources 26 such as fans, blowers, and other HVAC and lighting equipment.

Each of the nodes 14 on the high level MLN 12 may be a personal computer having contained therein a number of software applications for obtaining various data throughout a building and for controlling various building resources. Each node 14 may be a personal computer, such as an Intel® Pentium® processor based system with associated memory. Node 14 preferably operates on a Windows NT® operating system facilitating use of software applications in a graphical Windows-based format. MLN nodes 14 access a database 28 which may be a shared database among all the nodes 14 or may be an individual database in each node. Likewise, the nodes 14 may share software application programs 30 for carrying out various control and data acquisition requirements for a building automation system or other suitable application.

The database 28 includes activity definition data 32, calendar schedule data 34, global state text table data 36 and 1 through n sets of zone data 38 corresponding to the various zones in the building system. Activity definition data elements 32 are preferably represented as objects in the database 28. Each set of zone data include command table data 46, zone mode schedule data 48 and, if desired, optimization parameter data 50. The zone data 38 may also contain other parameters such as minimum off time data, enable/disable data, and warm start recommand information.

An activity definition data indicates how a particular building activity affects the zones. The activity definition data 32 includes: (1) activity name data 40, such as the text "volleyball game"; (2) data 42 representing a list of zones affected by the building activity; (3) for each zone, data 44 representing the required zone operating mode, for example, (occupied, unoccupied, cool occupied); and (4) for each zone, and if desired, data indicating whether the activity requires exclusive use of the zone.

For example, activity definition data 32 stored in the database 28 at the management level network 12 would include the activity definition data name information "volleyball game" 40 with zone data 42 and 44 as shown below in Table 1.

TABLE 1

Activity: Volleyball Game

| Zones Affected | Operating Mode (How) | Exclusive Use |
|---|---|---|
| GYM | COOL OCC | √ |
| LOCKERS | OCCUPIED | √ |
| MAIN HALL | OCCUPIED | |

Since each zone can be designated for exclusive use, this mechanism allows operators to avoid scheduling of multiple conflicting activities. The activity definition data 32 may comprise a database object and is preferably stored at the management level network only.

The zone data 38 is divided into n sets representing separate building zones. Points (analog/digital interface to building resources) that represent a single building resource are grouped into zones by zone data. Examples of building resources are fans, blowers, rooms and set points. Points in a common zone are commanded together according to similar parameters and schedules to represent the various zone operating modes or states.

Each zone has demands placed on it that require it to be controlled in a certain state. These states are considered to be the operating modes of the zone. Each zone in a building must have at least two operating modes: one when it is at rest such as during a vacancy period, and at least one when it is in demand as an occupancy period. If a zone has different types of demands placed on it, it would likely have several different operating modes, for instance representing different degrees of cooling set points.

As also shown in FIG. 1, each control node 20 in the BLN includes a database 52 which contains zone data 38a and calendar schedule data 34 received from node 14 of the MLN after an activity based scheduling operation has been completed. The zone data 38a in any one node 20 is a portion of the zone data 38. Since each node 20 controls a limited number of zones, only the zone data 38a corresponding to those zones need be transferred from the sets 1→n of zone data 38 in the MLN data base 28. The control nodes 20 have control programs for executing defined control strategies corresponding to the zone data 38a to control building resources through the FLN.

Figure 2:
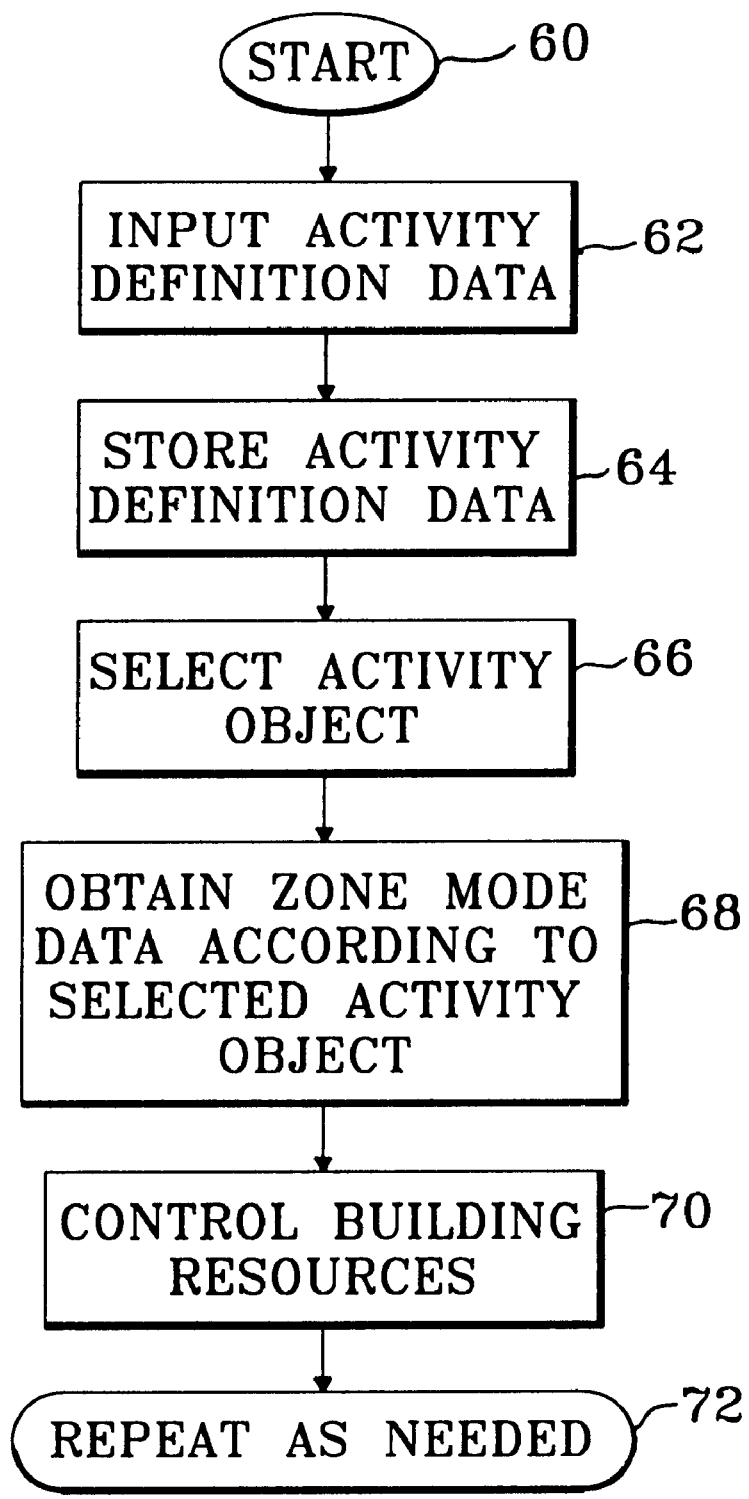
FIG. 2 is a flow diagram generally depicting a method of activity based equipment scheduling in accordance with one embodiment of the invention.

One embodiment of a method for activity based scheduling is generally shown in FIG. 2. As a preliminary step to continued operations, a technical operator sets up information necessary for activity based scheduling. The setup begins by obtaining clearance to access an activity based schedule application 56 stored in node 14 (step 60). This is done using well known security clearance techniques. The node 14 then receives activity definition data 32 (step 62) after preferably displaying a graphical user interface (GUI) and prompting a technical operator to enter activity definition data 32 from a keyboard or other input mechanism operatively coupled to the node 14. The node 14 then stores the entered activity definition data 32 in the shared database 28 (step 64).

The technical operator inputs the information through a database editor application 54. The technical operator enters activity definition data 32, including activity name data 40, like "basketball game", "volleyball game", or "meeting", the associated list of zones 42 that the activity affects, and the possible operational modes 44 of each of those zones for storage in the database 28. This preliminary technical operation readies the system for activity based equipment scheduling by nontechnical operators.

Such scheduling is available at node 14, which presents a GUI to an administrative operator that displays an activity name list to the user so the user may select one or more of the activities for scheduling from a calendar graphic, such as a picture of one month, that is linked to the calendar schedule data 34. Node 14 simultaneously displays a graphical depiction of at least a portion of a calendar (an example is shown in FIG. 5B) while also displaying an activity definition name. The user then "drags and drops" the activity definition name onto the selected day or days of the month to indicate when the activity is occurring on that day.

Prior to the dragging and dropping of the activity name graphic corresponding to activity name data 40, the node 14 automatically retrieves related data for activity name data 40 that was selected by the user (step 66). Once related data, e.g., zone list data 42 and mode data 44, have been retrieved by the node 14 from database 28 and the user drags and drops the activity name graphic to the calendar, the database editor application 54 prompts the user to the assign calendar attributes such as frequency of occurrence to the activity definition data. The node 14 stores the attribute data and links this data with the activity definition data 32. The node 14 processes the calendar information and activity definition data 32 to automatically determine a zone mode schedule 48 for the zone (or zones) based on the activity definition data 32 (step 68). The zone data is assigned and then the mode data is determined. The data 38 is segregated to sets of zone data 38a and sent to corresponding building level network nodes 18 which in turn process the information to determine which building resources need to be controlled. The building level nodes 18 containing the affected zones then control the building resources (step 70) to effect the desired mode of operation of the zone(s) for that activity at that particular day and time.

The preliminary steps 62 and 64 are typically performed by a technical operator when a system is initially installed. The activity scheduling steps 68–70 are typically performed each time an activity is to be scheduled or rescheduled, by administrative and other operators. The preliminary steps may be repeated to initially define new activities or to modify current definitions, and the scheduling steps whenever an activity is scheduled (step 72).

Figure 3:
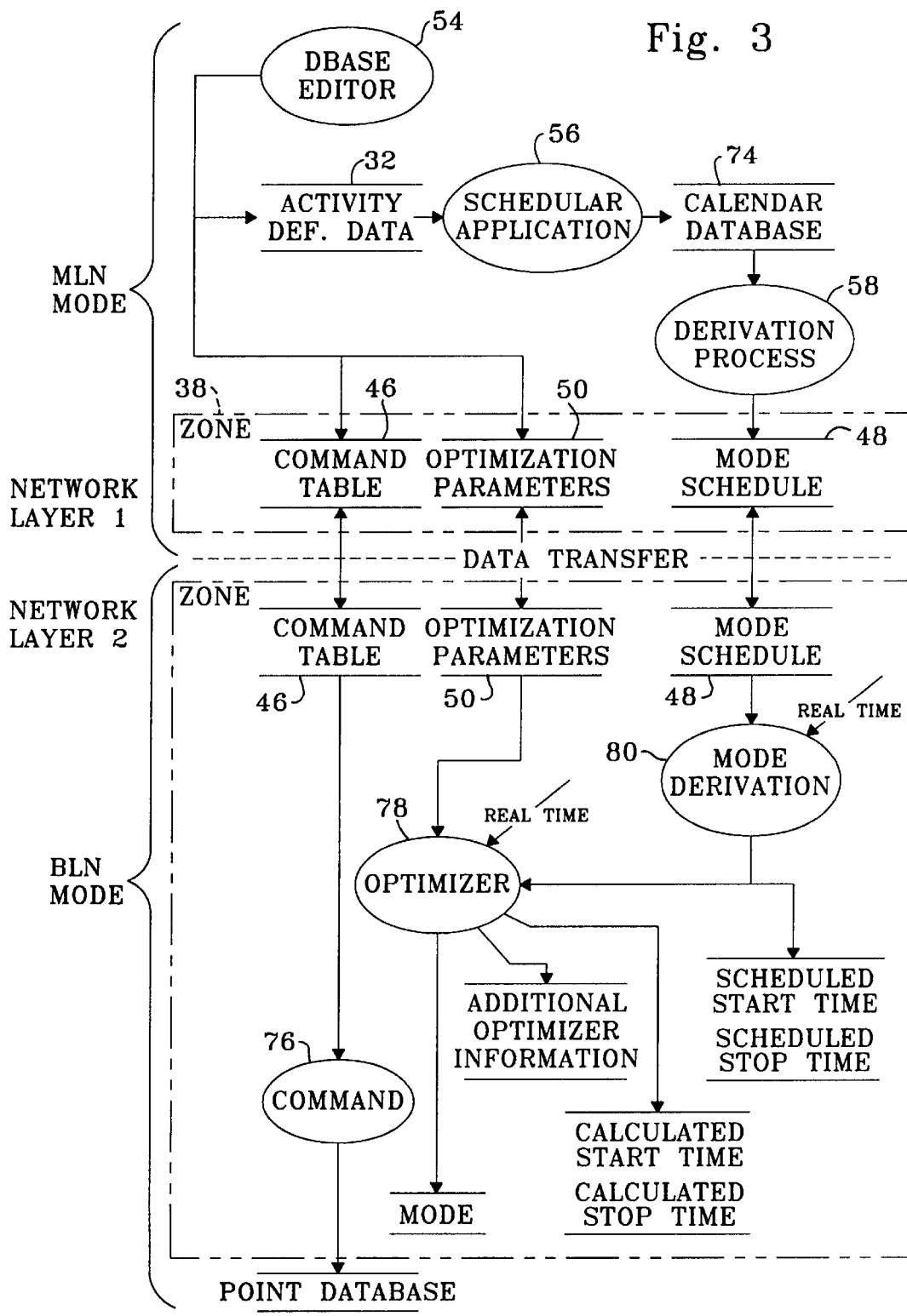
FIG. 3 is a data flow diagram generally depicting one embodiment of the activity based scheduler application in accordance with the invention.

Referring now to FIGS. 1 and 3, the data flow and processing of the activity based equipment scheduling system will be explained. One of the software applications residing on node 14 of the management level network includes the database editor 54 which may be a Windows®-based interface. The database editor 54 is a zone database editor that uses the database structure to create, edit and delete activity definition data 32, and zone data 38.

The scheduler application 56 links the activity definition data 32 to calendar information such as calendar schedule data 34 to create a calendar database 74 within the shared database 28. The MLN node 14 also includes a derivation processing program 58 which receives the calendar database information 74 as input and determines the zone mode schedule 48 for the zone data 38. Since the MLN node 14 has activity definition data 32 and calendar schedule data 34, it is able to automatically derive a zone mode schedule 48 for use in controlling building resources.

As also shown in FIG. 3, the zone data 38 is communicated to the building level network node 20 through network link 16. Preferably, it is apportioned into separate zone data sets 38a, so that only relevant data is communicated to each node 18. In the preferred embodiment, it is the building level network node 18 that processes the zone mode schedule data 48 to activate or deactivate the appropriate building resources 26 to accomplish the desired environmental condition of the chosen activity.

Where no conflicts exist, mode derivation 80 is accomplished through direct assignment of operational modes specified by the activity definition data 32 for selected times according to the drag and drop activity-calendar match. Otherwise, the mode derivation 80 conducted is essentially a conflict resolution problem. Conflicts arise only when two or more activities affect the same zones, permit shared use at the same time, and have different specified operational modes for the common zone(s). Conflicts are resolved by reference to the global state text table 36, which lists operational modes in a priority order. When two activities have conflicting operational modes, the higher priority operational mode is selected. Start and stop times might be altered by an optimization 78 before the mode 18 commands (step 76) the controllers 24. Thus, mode operational conflicts are permitted upon selection of activities during scheduling by a nontechnical operator, and are resolved during mode derivation 80.

A more detailed flow diagram of the steps used by the network computer system 10 to set up and execute the activity based equipment scheduling method is depicted in FIG. 4A and FIGS. 4B through 4D represent examples of screen displays generated by the node 14 depicting Windows®-based graphical user interfaces for inputting data and displaying data.

To initially set up the activity based scheduling system, activity definition data 32 and zone data 38 are entered. A technical operator such as a field engineer starts the process (step 90) by entering a user ID that is verified by the system 10. If the system 10 confirms that the user ID is proper, the technical person is prompted by an activity builder module in the database editor 54 adapted for displaying screens such as those shown in FIG. 4B. The technical operator assigns point information to building resources (step 92). This includes identifying points that are commanded during the various modes of operation.

Steps 94 and 96 are used to initially create the sets of zone data 38. Creation of a single set of data is considered here for simplicity of explanation, but remaining sets are created in like fashion. First, the node 14 partially populates the set zone data 38 using data entered by the technical operator (step 94). The node 14 assigns or links the elements of global state text table 36 for each zone, as selected by the technical operator, to set the possible operational modes for the zone. This allows each set of zone data to have a unique or common set of operating modes. A default state text table or alternate state text table may also be used for the cases where an operator fails to choose state text table links or wishes to attach an alternate text table. The state text table 36 is global because it is accessible and used by other applications outside the equipment scheduler.

Next, the node 14 creates command table data 46 with its associated points for the zone (step 96) to effect any possible selected mode of operation for the zone. The node 14 links points to the zone. A zone's command table data 46 specifies how the zone's points will be commanded upon entry of each of the zone's operating modes. To summarize, using the database editor 54 (activity builder), the technical operator creates the zone data 38 zone by zone or by designating common operational modes for groups of zones. For example, in FIG. 4B, the zone named Engineering Room 352 has the operating modes VAC, OCC 1, OCC 2 and OCC 3 and point 96 is commanded to a particular position (on/off, for example) depending upon the occupancy mode.

An example of a command table is shown in Table 2 below.

TABLE 2

Zone: GYM

| Points | Modes | |
|---|---|---|
|  | VACANT (default) | OCCUPIED |
| FAN1 | OFF | SLOW |
| FAN2 | OFF | SLOW (+5) |

The command table data 46 describes at least two modes: one default mode for vacancy periods, and one or more modes for occupancy periods. Mode names are defined in the state text table 36 linked with the zone. The lowest priority mode in the command table is the default mode, indicating the state of the points when the zone is vacant. Preferably, the assignment of the default mode cannot be modified after it is initially set during zone creation. If it were modified, this may cause inconsistencies within the zone mode schedule 48.

Preferably, the database editor 54 used by a technical operator to generate the activity definition data 32 for each activity is also used by the technical operator after the creation of the zones and the command table data to generate activity definition data (step 98). The node 14 links the zone data 38 to the activity definition data 32. Once activity definition data 32 and the zone data 38 have been defined by the input from the technical operator, the information is stored in the database 28 for use during normal operation of the system by other operators. For example, for an activity named "Work Day", the technical operator inputs the zone name data 40 of those zones affected by the activity "Work Day". Zones that would be occupied during the "Work Day" activity would include, for example, an Engineering Room 352 and Marketing Room 308. Activity definition data 32 includes the list of zones 42, zone name data 40 and preferred operating modes of the zones 44.

With the activity definition data 32 and associated zone data 38 input, the activity based scheduling system can then be easily used by nontechnical operators to actually schedule activities on a calendar. Node 14 permits all activity to be scheduled based on easily recognizable input information by a nontechnical system user (step 100). As seen in FIG. 4C, a user is presented with a display of activities, for example, 32a, 32b, 32c. The node 14 also displays a graphic calendar (shown in FIG. 5B) to which any or all of the activities 32a–32c can be dragged and dropped for an association with a particular day of the week or days of the year as often as desired.

The node 14 then uses the association of the activity definition data 32 with the calendar data 34 and associated attributes to automatically generate the zone mode schedule 48 (step 102) including data such as the day of the year, the duration of the occupied period, the start and end time and the name of the zone along with many optimization parameters as shown in FIG. 4C. This information is stored and may be displayed for visual analysis by the nontechnical operator in a Windows®-type format such as that shown in FIG. 4C. Each zone has one mode schedule showing the future occupancy periods for the zone. Each occupancy period in the schedule includes a start time, stop time, number of time periods, for instance days, spanned, frequency of occurrence, and zone operating mode. The absence of an occupancy period during the day implicitly indicates the existence of a vacancy period at which time the zone will enter the default operating mode (vacancy). The default mode need not be scheduled. Hence, the equipment scheduling system performs an automatic occupancy/vacancy determination to determine a default condition so that the default mode need not be scheduled. Each zone also contains a minimum off time parameter, adjustable by an operator. The purpose of the minimum off time parameter is to avoid short vacancy periods between scheduled occupancy periods in the zones' mode schedules.

An example of a zone mode schedule for a particular zone is shown below in Table 3.

TABLE 3

| Activity | | | | | | | | | |
|---|---|---|---|---|---|---|---|---|---|
| Classes | | OCCUPIED | | | | | | | |
| Assembly | | | | OCCUPIED | | | | | |
| Volleyball Game | | | | | | | OCCUPIED | | |
| | 6:00 | 8:00 | 10:00 | 12:00 | 14:00 | 16:00 | 18:00 | 20:00 | 22:00 |

Once the command table data 46 and zone mode schedule data 48 is created and any optimization parameter data 50 are identified, the zone data 38 is separated into zone data sets 38a, which are transmitted to respective nodes 20 in the BLN (step 104). As previously described with respect to FIG. 3, the building resources 26 are then controlled in accordance with the activity definition data 32 based on the zone mode data sets 38a, which include zone mode schedule data 48, command table data 40, and optimization parameters 50 (step 106).

Figures 4A, 5A:
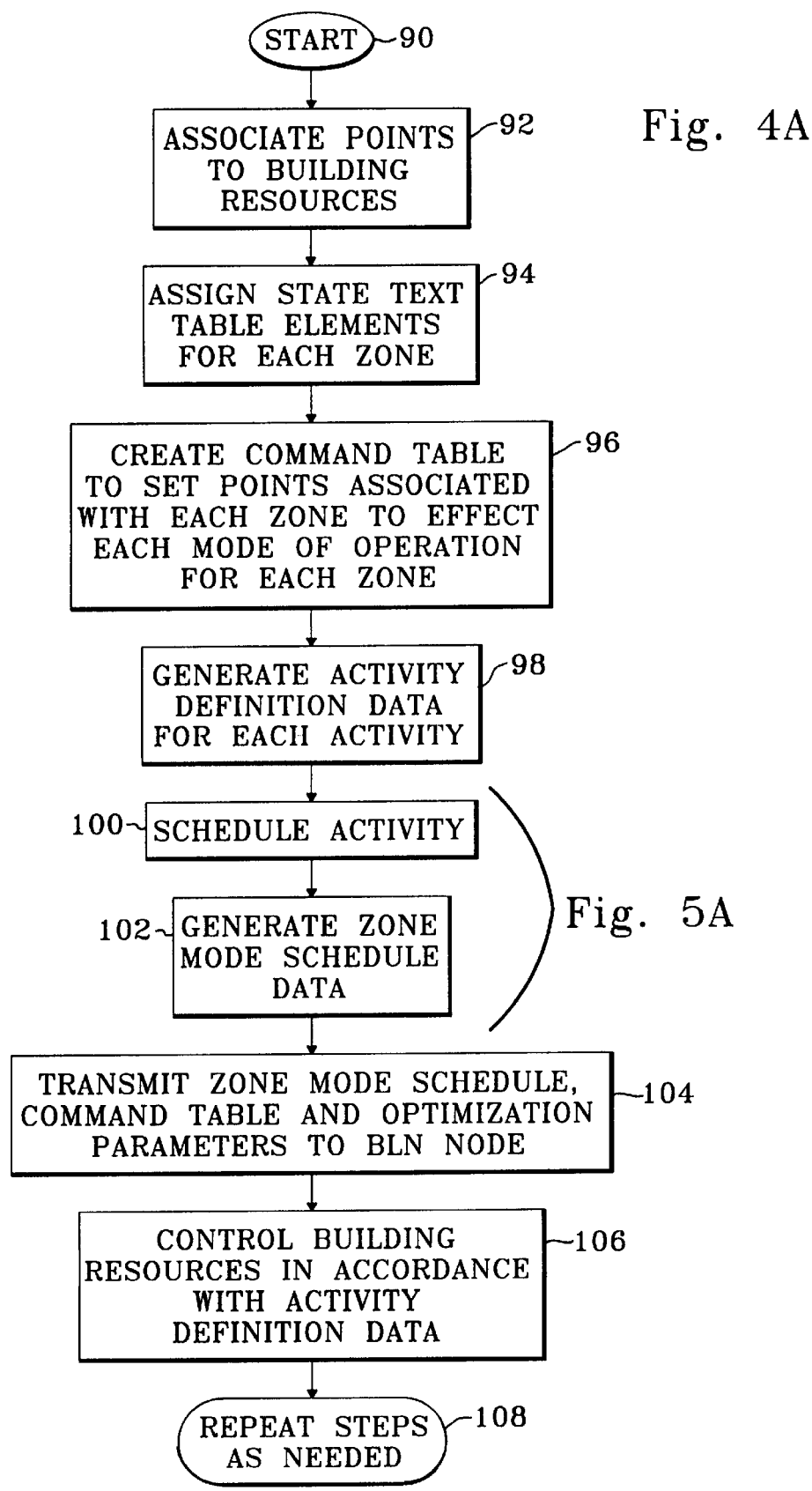
FIG. 4A is a detailed flow diagram depicting a method of activity based equipment scheduling in accordance with one embodiment of the invention.
FIG. 5A is a detailed flow diagram depicting the scheduling operation and generation of the mode schedule data shown in FIG. 4A.
Figure 4B:
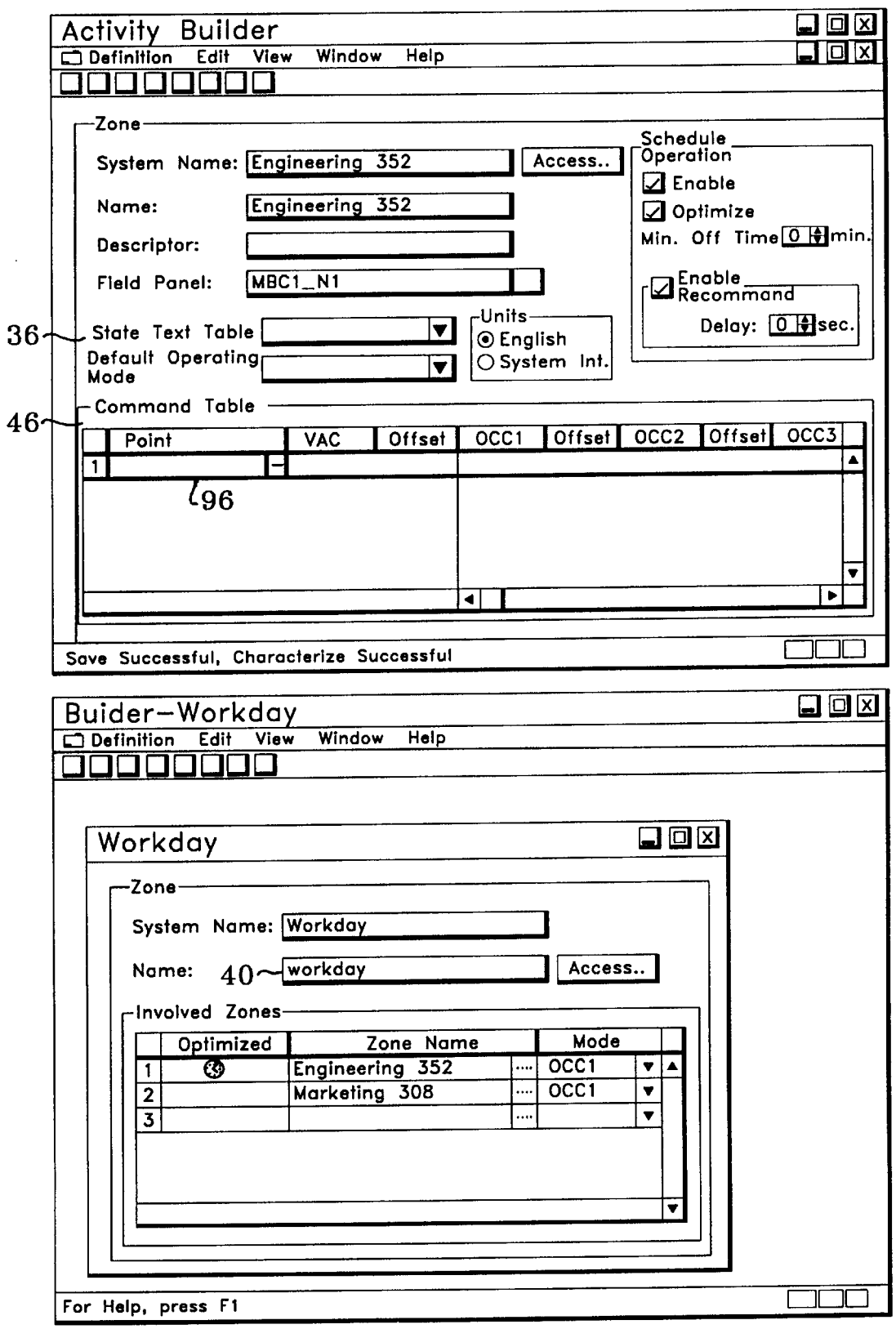
FIGS. 4B–4D generally depict examples of screen displays generated by an embodiment of an activity based equipment scheduler system in accordance with the invention.
Figure 4C:
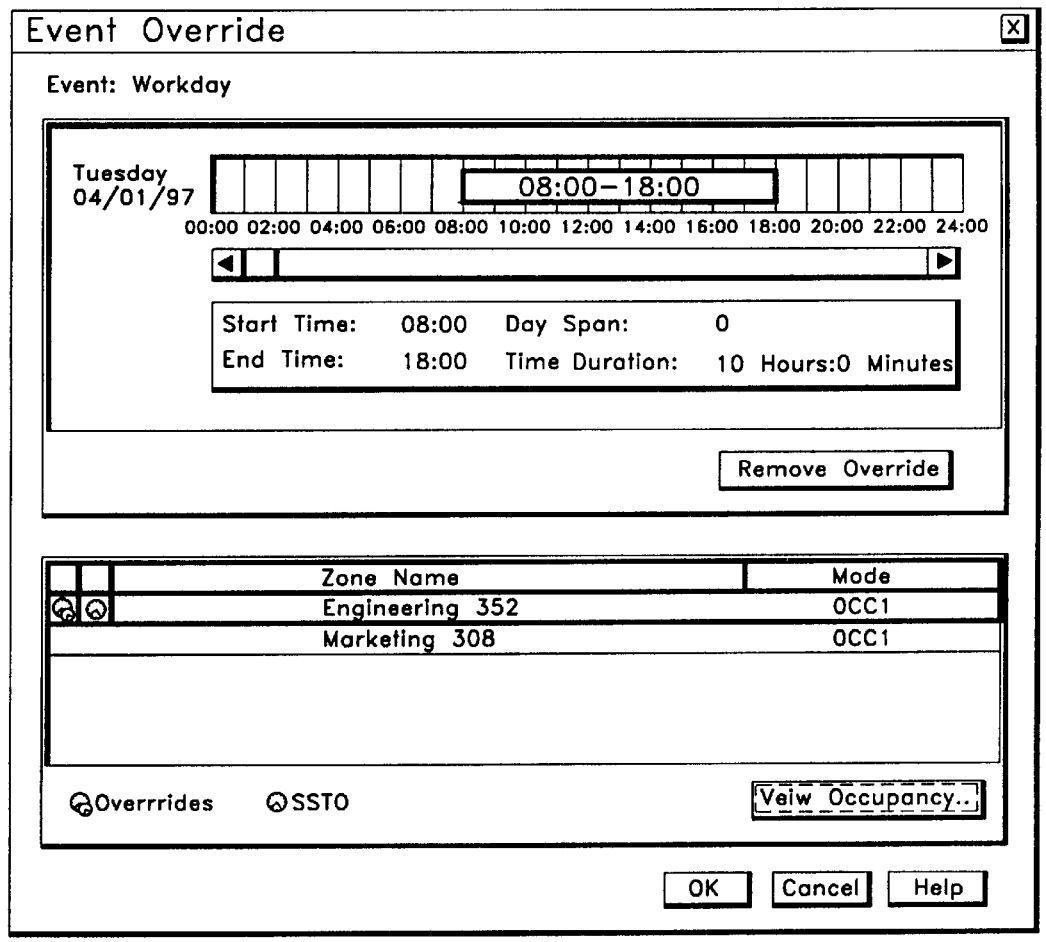
Figure 4C:
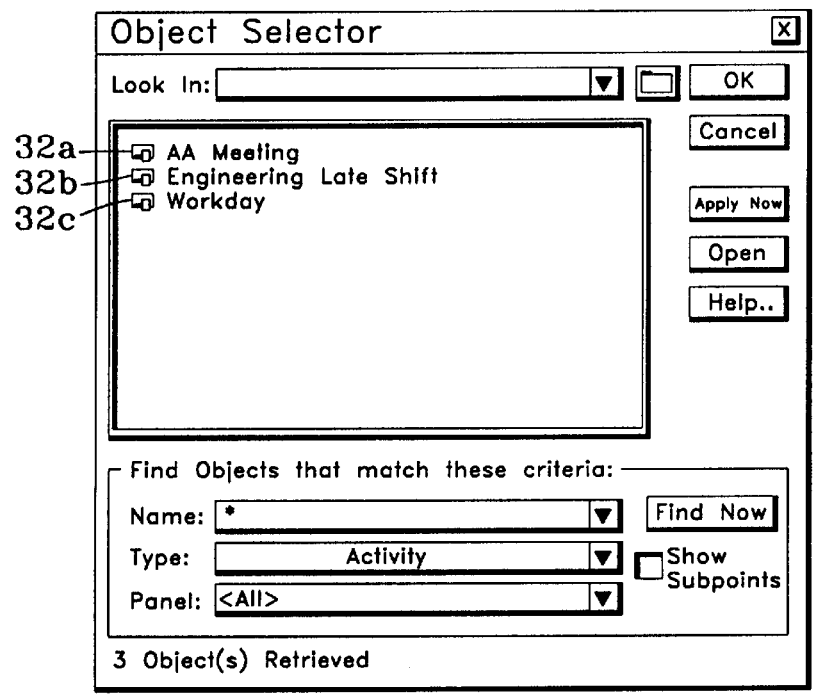
Figure 4D:
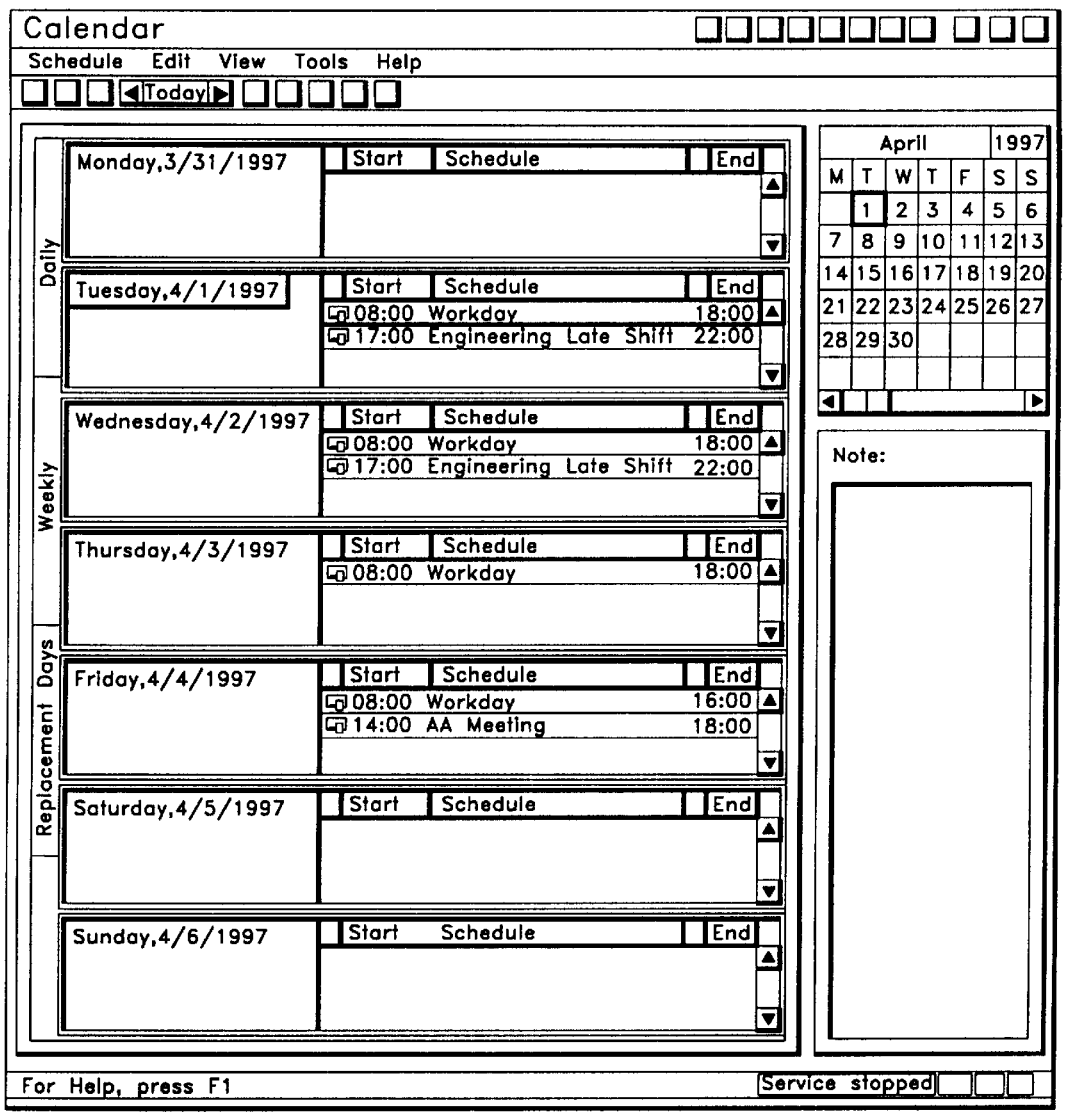
Figure 5A:
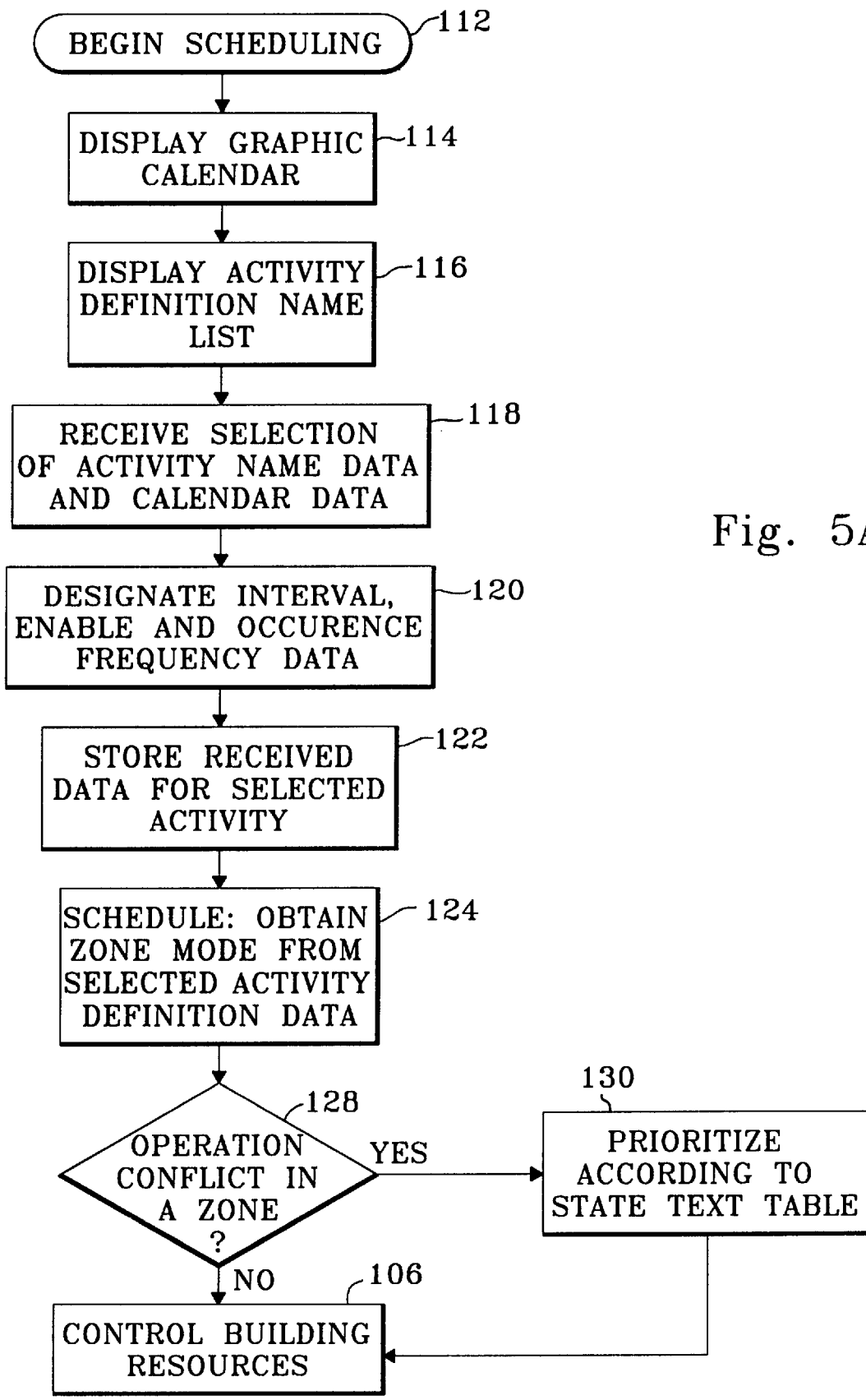

As shown in FIG. 4D, the node 14 may display a complete system schedule for any given day or week showing scheduled activity names and start and end times, identifying those activities that are scheduled for the selected time frame. Any or all of the steps can be repeated to effect setup or actual scheduling as needed (step 108).

FIG. 5A is a detailed flow diagram depicting generally the scheduling activity step 100 and the generation of zone mode schedule data 48 of step 102 of FIG. 4A. The equipment scheduling system schedules activity data when a user selects the scheduling option on the activity scheduler application 56 (step 112). Under control of the activity scheduler application 56, the node 14 displays a graphical representation of a calendar 113 (see FIG. 5B) which may be any suitable section of a calendar including a single day, a portion of a day, one month, a number of months, or an entire year (step 114). This calendar information 113 is stored in the database 28 and is preferably displayed in a Windows®-based format. On the same screen, under control of the activity scheduler, the node 14 also transmits a list of activity definition data 32 to the display device for simultaneous display of the list along with the calendar information 113 (step 116). With the calendar data 113 displayed and the activity definition data 32 displayed, a user may drag and drop an activity or activities from the list onto the appropriate days of the calendar. In other words, an activity is placed on the calendar. A single activity can be assigned to the calendar 113 any number of times. The selected information is then received by the node 14 through the activity scheduler application 56 and is linked in the database 28 (step 118). In the example of FIG. 5B, the activity "school operation" is scheduled to Sep. 4, 1998.

Once the activity definition data 32 is selected and the calendar information selected, the activity based equipment scheduler requests time interval data for the activity, enable/disable data and the frequency data of the activity (step 120). It is contemplated that although all this information is preferably requested by the node 14, any single data or varying combinations may also be requested depending upon the application. After this data is requested, node 14 stores the time interval data, enable/disable data and frequency data of the activity as attributes of the activity definition data object 32 (step 122). Afterward, the node 14, under control of the activity based scheduler equipment scheduler application, schedules the selected activity (step 124). This is accomplished when the system processes the information to generate the zone mode schedule data 48 based on the stored activity definition data 32.

The system next determines whether or not there is a conflict in the zone mode operation with another zone schedule (step 128). If the system determines that there is a conflict, the zone mode schedules are prioritized according to the priorities set in the global text table 36 (step 130) so that an occupancy mode, for example, would take priority over a vacancy mode so that the zone is controlled to accommodate occupancy. If there is no conflict, the building resources are controlled by the building level network node 18 directly according to the zone data 38a (step 106).

Since a single activity definition can be assigned to the calendar 113 any number of times, activity data 32 can be scheduled for an entire year or months at a single scheduling session. This alleviates the problem of scheduling only on a weekly basis as in many conventional systems.

Each time activity definition data 32 is scheduled on the system calendar 113, the activity definition data 32 or object is assigned the following attributes: a time interval (start time, stop time, and number of days spanned), a frequency of occurrence (one time, repeated weekly, or replacement day), if the activity is repeated, a date range during which if active, is stored. This feature is optional. If the date range data is not entered and stored, an activity is considered to occur continuously. Lastly, an enable/disable flag is selected. The activity is enabled by default but can later be modified to a disabled status to allow the operator temporary control to turn off the activity without removing it from the schedule entirely.

A zone's mode schedule data 48 is then derived from the set of scheduled activities affecting that zone. The activity definition data 32 in this scheduled program are used to populate the various zone mode schedules 48.

Figure 6:
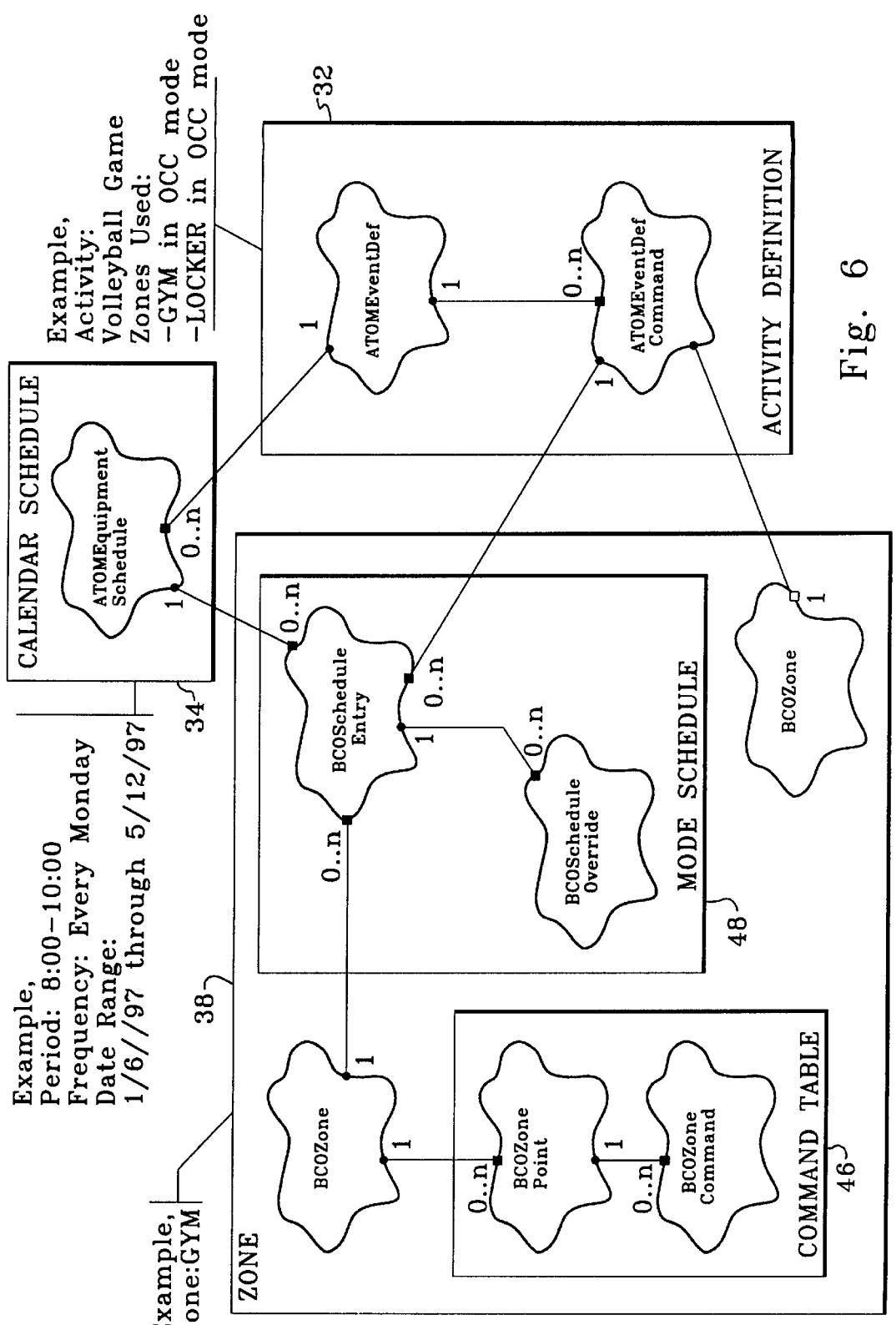
FIG. 6 is a Booch type diagram showing object oriented relationships among object classes as used by one embodiment of the invention.

In the preferred embodiment the database structures used to populate the zone mode schedules are related sets of object classes, whose associations are shown in the FIG. 6 Booch diagram. In FIG. 6, ATOM refers to activity system object classes held only in the MLN 12. Building control objects (BCO) are classes held at the MLN 12 which are also routed to the BLN 18.

The classes which together define the zone data 38 are the BCOScheduleEntry, BCOZone, BCOZScheduleOverride, BCOZonePoint, and BCOZoneCommand classes. The latter two classes define the command table data 46. The BCOZone class is a database object containing a zone's name, list of operating modes, default operating mode, minimum off time and optional schedule optimization parameters. As shown in FIG. 6, objects in the BCOZone class contain zero to many objects of class type BCOZonePoint and zero to many objects of class type BCOSchedule entry.

The BCOZonePoint class defines a database object storing a reference to a building resource, such as a fan or a light. BCOZonePoint objects contain zero to many objects of class type BCOZoneCommand.

The BCOZoneCommand class defines a database object that stores a point command value and time offset for one of the zone's points. BCOZoneCommand also stores a zone mode indicating under which zone operating mode a command should be issued.

The BCOScheduleEntry class defines a database object which stores a single zone mode schedule entry. This data includes an occupancy start time, end time, number of days spanned, enable/disable flag frequency and operating mode. Objects of this type contain zero to many objects of class type BCOScheduleOverride.

The BCOScheduleOverride class defines a database object that stores a modification to a zone mode schedule entry on a particular date. This data, like the BCOScheduleEntry data, includes an occupancy period start time, end time, number of days spanned, enable/disable flag and operating mode. In addition, this data includes a date indicative of the particular date for an override. Together the BCOScheduleEntry and BCOScheduleOverride define a zone's mode schedule data 48.

The activity definition data 32 is defined by the ATOMEventDef class and the ATOMEventDefCommand class. The ATOMEventDef Class defines a database object which stores an activity name. Objects of this type contain zero to many objects of class type ATOMEventDefCommand and zero to many objects of class type ATOMEquipmentSchedule.

The ATOMEventDefCommand class defines a database object that stores information regarding zone usage by activity. The data includes a single zone as a reference to an object of class type BCOZone, a zone operating mode, and a flag indicating if the zone must be used exclusively. Objects of this class type contain zero to many objects of type BCOScheduleEntry, which represent a set of mode schedule entries created as a result of the activity definition being scheduled zero to many times.

The data object hierarchy is completed by the ATOMEquipmentSchedule Class, which is formed of the calendar schedule data 34. Associations for this object are completed by user operation during an activity scheduling after a technical operator has completed operation to form the zone and activity definition classes. Thus, the ATOM Equipment Schedule class defines a database object which stores information regarding a scheduled activity. This data includes activity start time, end time, days spanned, enable/disable flag and frequency of recurrence. Objects of this class type contain zero to many objects of type BCOScheduleEntry, forming a list of a set of zone mode schedule entries created by an activity being scheduled.

Another feature of the equipment scheduling system is the ability to allow command staging by storage of additional parameters in the database structure. For each command value in the command table 46, the operator may specify a positive offset time in minutes indicating how long after the mode start time to wait before issuing the command. Negative offsets are not entered. If the zone points must be commanded prior to the zone occupancy time, the occupancy period is simply scheduled earlier than actual zone occupancy.

The equipment scheduling system also utilizes an optional optimization parameter system as known in the art. If a zone is optimized, the occupancy and vacancy start times (or occupancy stop time) in the zone mode schedule will be adjusted through start/stop optimization. The time adjustment is based on set parameters entered by the operator which describe the heating and cooling characteristics of the space.

Data transfer between the management level network 12 and the building level network 18 is such that information contained as zone data 38a is that data which includes data corresponding to the command table data 46, zone mode schedule data 48, and any optional optimization parameters data 50 for a node controlling the referenced zones. The calendar information 113, stored as the calendar schedule data 34 also is transferred but it is a database global to all building level network computers 20. Once in a node 20 on the building level network, the control computer 20 processes the zone mode schedule data 48 of the zone data 38a. The control computer 20 also contains an editor to allow the zone mode schedule data to be modified, if necessary, by a maintenance operator.

The zone data sets 38a are assigned to corresponding ones of the BLN control computer nodes 20. The entire contents of the zone data 38a are stored and processed in that BLN computer. In operation, the building level network control computer 20 uses its own clock and a mode derivation algorithm to pass information to an optimizer concerning the zone's next occupancy period and operating mode. If optimization is enabled, the optimizer uses the information along with the zone's optimization parameters to establish the zone's current operating mode. If optimization is not enabled, the optimizer establishes the zone's current mode based directly on the zone mode schedule data 48, after resolution of any conflicting operational modes. When the zone's mode value changes, a command is issued to command the zone points to the value specified in the zone's command table 46.

The management level network computer 14 will combine all of the day's activities to produce a resulting zone mode schedule. The zone mode schedule contains references to the scheduled activities that affect the zone. The date and time information stored in the database 28 allow the processor to derive the actual mode schedule data.

In creating and entering activity definition data 32, any zone can be entered into the list of zone data 42, and the same zone can be assigned to one or many activity definition elements. Scheduled activities are generated by the computer 14 assigning activity definition data 32 to days on the calendar.

Also, the system generates a zone schedule report for selected zones and the information includes the zone mode schedules for a specified date range. Where a point name is used, the zone containing the specified point is retrieved from the database and listed in the report.

Figure 7:
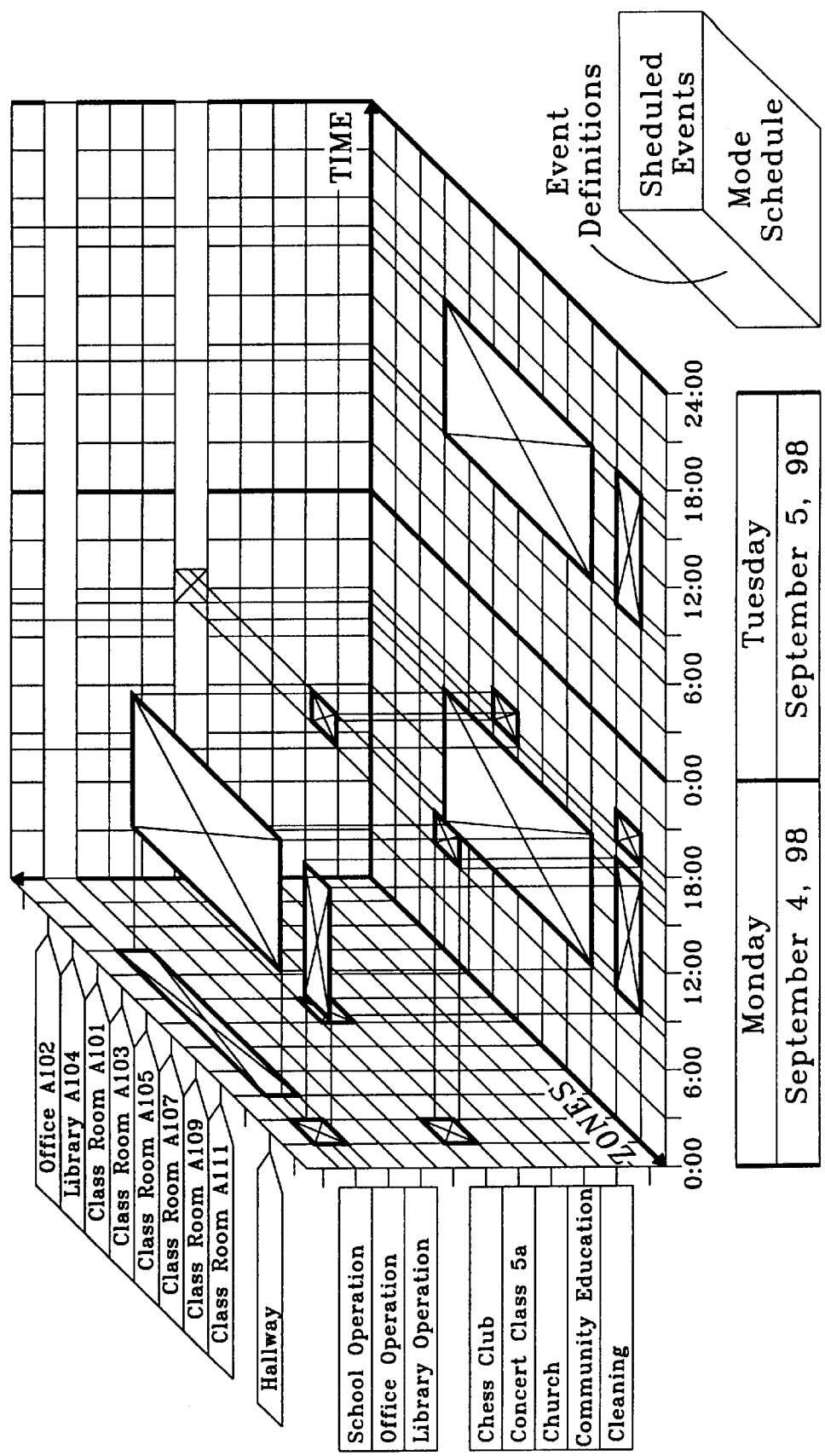
FIG. 7 is a three dimensional graphical representation of the steps used to schedule building resources in accordance with the present invention.

The completion of two such scheduling operations by the activity scheduler is represented graphically in FIG. 7. The activities, e.g., "school operations", "office operations", etc., are defined by a technical user as affecting zones, e.g., "office", "library", etc., as indicated by shading along the event definition plane. A nontechnical user may then match activities, as indicated on the scheduled event plane, to dates and times. In FIG. 7, the mapping of "school operations" and "chess club" activities to separate times is shown. The result is a system completed creation of zone mode schedules for all the zones in the system, as indicated on the mode schedule plane. As explained above, the final mode schedule may be produced after resolution of any operational mode conflicts and optimizations.

In summary, activity definition data is initially defined by a technical user concerned with how a space is controlled. Activity definition data is then used by administrative users that only wish to define when a space is used. Hence, initial scheduling and rescheduling of spaces is made more reliably and simply by a nontechnical user.

It should be understood that the implementation of other variations and modifications of the invention in its various aspects will be apparent to those of ordinary skill in the art, and that the invention is not limited by the specific embodiments described. For example, the system may be a single computer, a single network or multi-layered network.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What we claim is:

1. A method of controlling the scheduling and operation of a heating, ventilating and air conditioning system in a building that has a plurality of operating zones corresponding to areas within the building, wherein the system includes a user interface with a display and graphical calendar software the method comprising the steps of:

inputting activity definition data for at least one predetermined activity including a name, said activity definition data including operational mode data identifying the zones that are affected be said predetermined activity and specifying how the system operates with respect to the identified zones;

storing said predetermined activity definition data;

selecting said stored predetermined activity name and associating said name with at least one date on the calendar;

said associating step resulting in the system operating in accordance with said activity definition in said identified zones at said at least one date.

2. The method of claim 1 wherein said operational mode data includes time interval data, start time data, stop time data, number of days spanned data, frequency of occurrence data and duration range data.

3. The method of claim 1, wherein during said inputting step a plurality of activity definition data are inputted, said method further comprising the step of implementing a mode derivation procedure for resolving any zone operational mode conflicts resulting when two of said activity names are selected that designate different operational modes for a common identified zone at a common time.

4. The method of claim 1, wherein the step of selecting further includes displaying a graphical representation containing activity name data; displaying a graphic representation of at least a portion of a calendar having an associated calendar schedule object; and linking the predetermined activity name data to the calendar schedule object.

5. The method of claim 4 wherein the predetermine activity name data is linked to the calendar schedule for a plurality of different days to effect multiple week scheduling.

6. The method of claim 2 wherein said operational mode data further includes designation of whether the zone operational mode data requires exclusive use of any identified zone.

7. A networked building control system for primarily controlling the scheduling and operation of heating, ventilating and air conditioning equipment, the system having a plurality of operating zones corresponding to areas within the building comprising:

a first node, said first node having:
input means for receiving activity definition data representing predetermined activities that occur in the building, said activity definition data for each predetermined activity including activity name data and zone mode data for identifying the zones that are affected by said predetermined activity and specifying how the identified zones in the building control system operate during the predetermined activity,
storing means for storing said activity definition data for present and future use in scheduling building equipment,
schedule means for displaying a user interface, said user interface being adapted to selectively display each of said predetermined activities by its name data and a calendar, and permit a user to schedule a predetermined activity by associating the name of said predetermined activity with said calendar,
transmission means for transmitting said zone mode data of each predetermined activity that has been scheduled through said schedule means; and,
a second node for receiving said transmitted zone mode data and automatically controlling the equipment in accordance with said zone mode data.

8. The system of claim 7 further comprising mode derivation means for resolving zone mode operational conflicts between nonexclusive activities having different operational modes that were scheduled for a common building zone at a common time.

9. The system of claim 7, wherein the first node is on a first network layer and the second node is on a second network layer.

10. The system of claim 9, wherein storing means is a shared memory device and contains the activity definition data for use by the first network layer.

11. The system of claim 7 wherein said schedule means displays a graphical calender and permits association of displayed predetermined activity name to said graphical calender through a drag and drop of said predetermined activity name onto a portion of said graphical calender.

12. The system of claim 7 wherein said predetermined activity definition data further comprises exclusive use data for specifying whether an activity requires exclusive use of identified zone in the building, and said schedule means prevents scheduling of activities that conflict with specified exclusive use data for a previously scheduled activity.

* * * * *